Aug. 26, 1941.  H. C. KARST  2,253,936
AQUATIC AMUSEMENT DEVICE
Filed Oct. 28, 1938  3 Sheets-Sheet 1
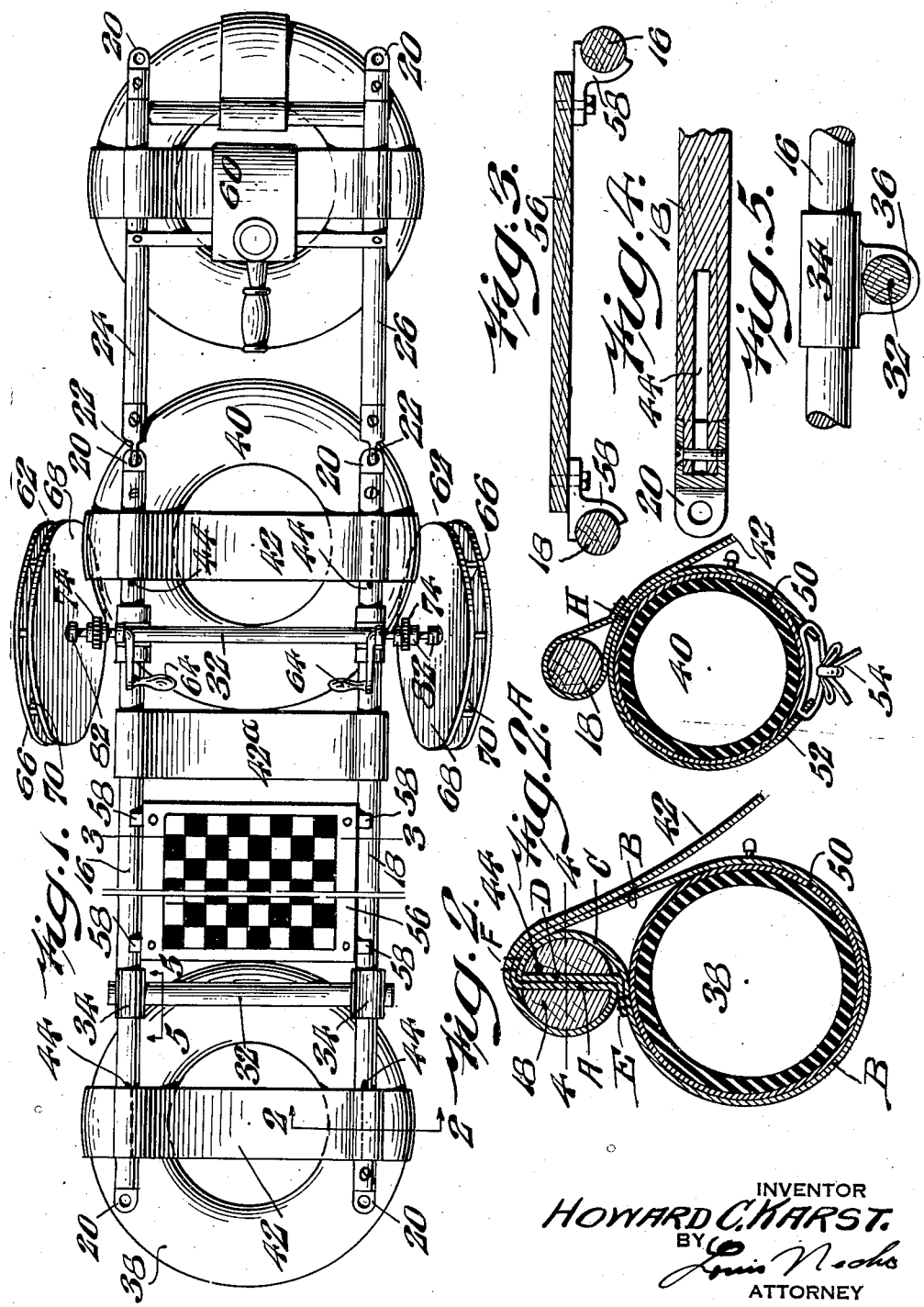
INVENTOR
HOWARD C. KARST.
BY
ATTORNEY

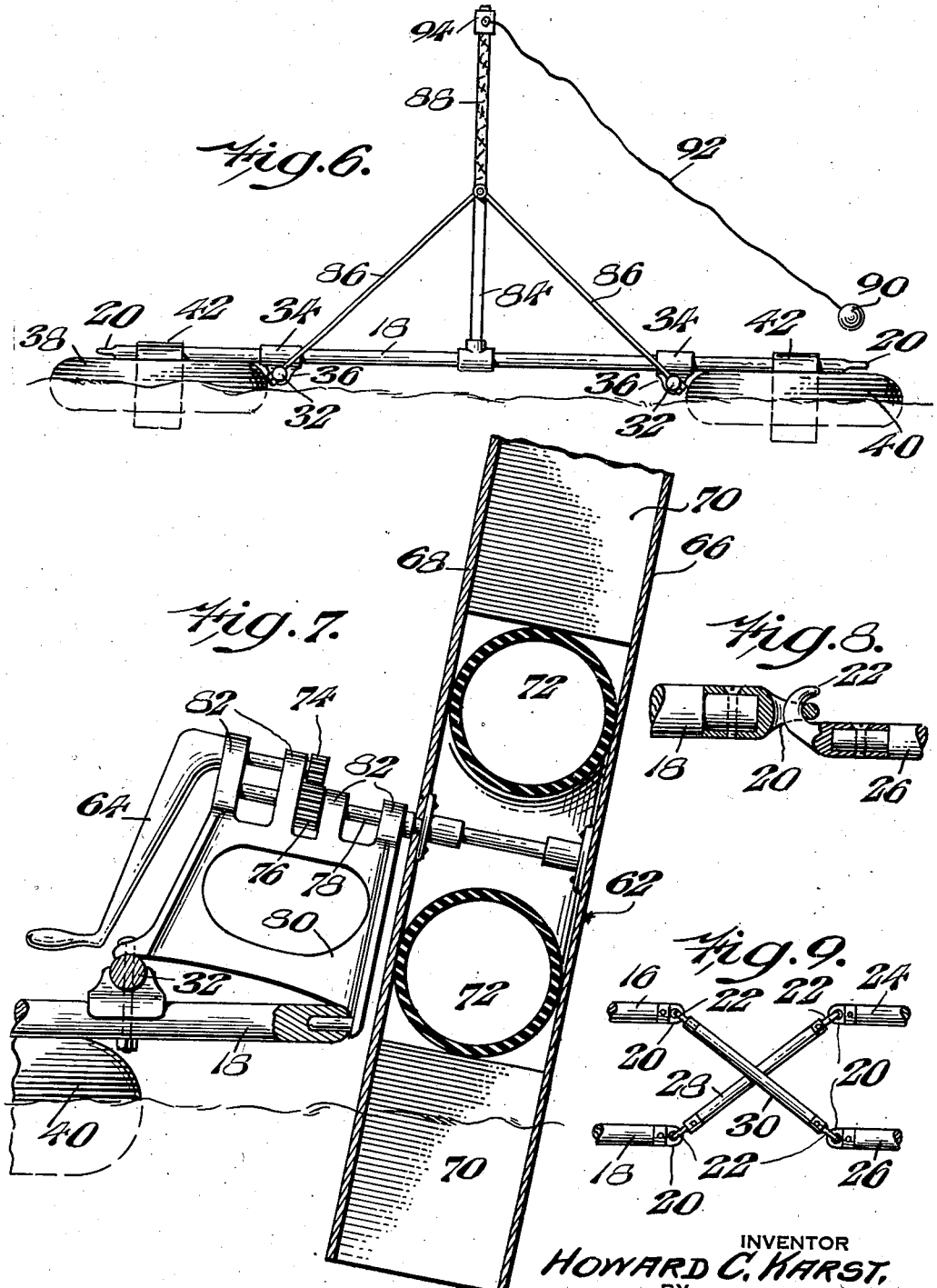

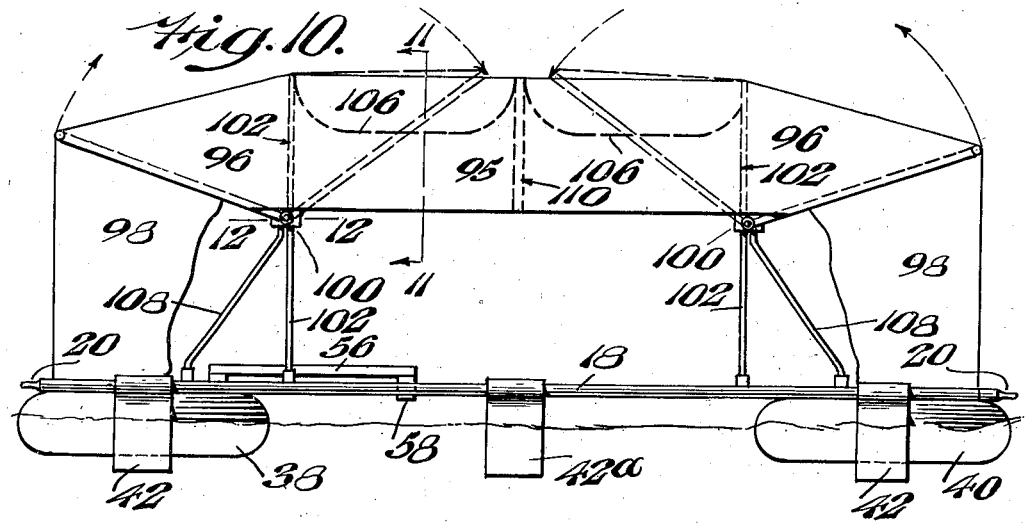
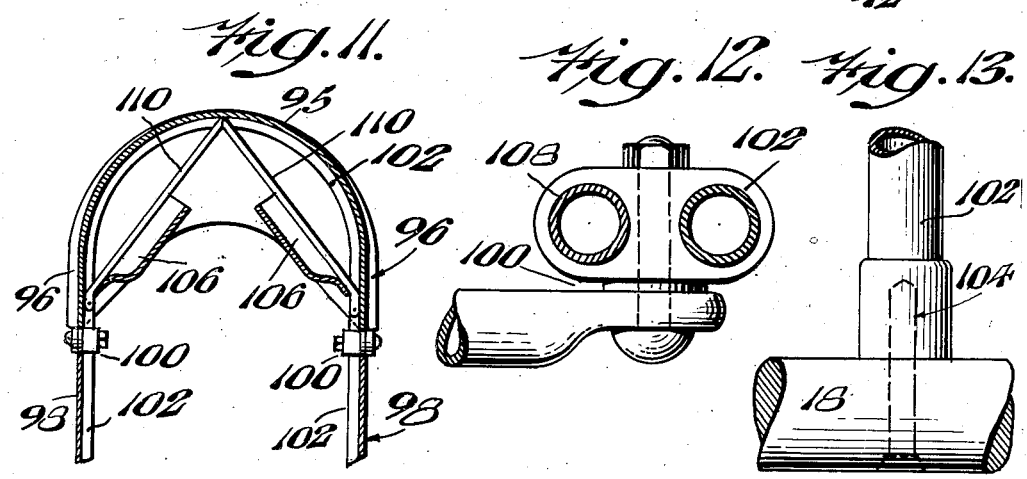
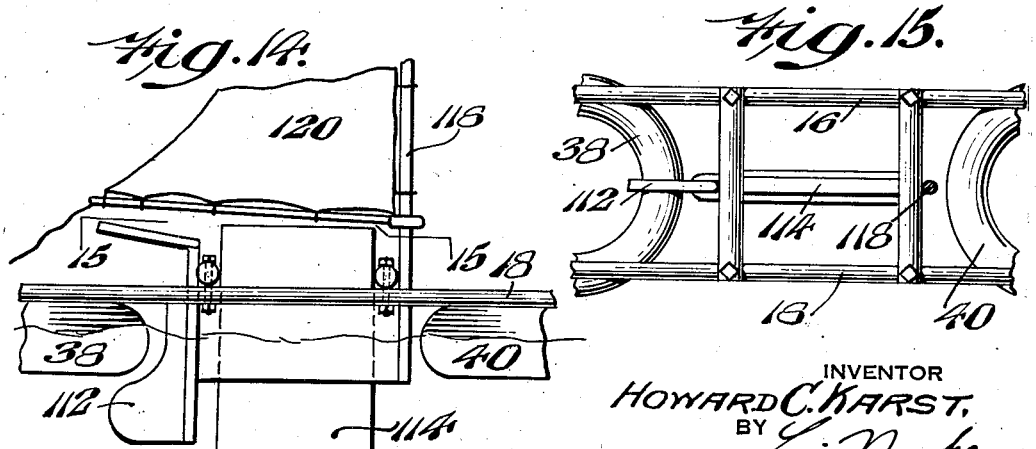

Patented Aug. 26, 1941

2,253,936

UNITED STATES PATENT OFFICE 2,253,936

AQUATIC AMUSEMENT DEVICE

Howard C. Karst, Hanover, Pa.

Application October 28, 1938, Serial No. 237,405

3 Claims. (Cl. 9—1)

My invention relates to a new and useful aquatic amusement device which is calculated to be operated by hand or by a motor and which is constructed in a knock-down, detachable manner for easy transportation.

My novel aquatic amusement device also contemplates the provision of sails for propulsion, canopies for protection and privacy, as well as means for mounting or supporting amusement devices such as "table tennis," "checkers" or the like.

The construction and operation of my invention will be more clearly understood from the following specification and the accompanying drawings in which:

Fig. 1 represents a top plan view of an aquatic amusement device embodying my invention, certain parts being omitted.

Fig. 2 represents, on an enlarged scale, a section on line 2—2 of Fig. 1.

Fig. 2a represents a view similar to Fig. 2 showing a modified form of construction.

Fig. 3 represents on an enlarged scale a section on line 3—3 of Fig. 1.

Fig. 4 represents a fragmentary view on a reduced scale on line 4—4 of Fig. 2 with the canvas, which is shown around the pole in Fig. 2, omitted.

Fig. 5 represents on an enlarged scale a section on line 5—5 of Fig. 1.

Fig. 6 represents a skeleton side elevation shown on a reduced scale and showing the application of means for the applying of a ball game simulating tennis.

Fig. 7 represents on an enlarged scale a view partly in section and partly in elevation showing the construction and operation of the paddle wheels for propelling the boat.

Fig. 8 represents a fragmentary view showing, on an enlarged scale, means for connecting the sections of the side rails of the aquatic amusement device together.

Fig. 9 represents a fragmentary plan view showing a modified form of interconnecting the supporting rails.

Fig. 10 represents a skeleton side elevation of the aquatic amusement device shown provided with a canopy and side curtains, the latter being partly broken away.

Fig. 11 represents, on an enlarged scale, a fragmentary section on line 11—11 of Fig. 10.

Fig. 12 represents, on an enlarged scale, a fragmentary section on line 12—12 of Fig. 10 showing the hinged support for the canopy.

Fig. 13 represents, on an enlarged scale, a sectional view on line 13—13 of Fig. 10.

Fig. 14 represents a fragmentary view in side elevation showing the application of a sail as well as the provision of a balancing center board and rudder.

Fig. 15 represents a section on line 15—15 of Fig. 4.

Referring to the drawings in which like reference characters indicate like parts, the aquatic amusement device embodying my construction comprises two parallel side rails 16 and 18 which are provided at their opposite ends with eyes 20 which are adapted to receive the hooks 22 of additional extensions at either end if desired, such as the extension consisting of the arms 24 and 26 which will be further described. It is also apparent that the rails 16 and 18 can be provided with hooks on one end and eyes on the other, interchangeably, so as to engage hooks or eyes on the extension that may be used on either end. The extensions 24 and 26 may be connected as shown in Figs. 1 and 8, or, if desired in order to facilitate turning, a cross-arm arrangement such as that shown in Fig. 9 may be utilized in which the rail 18 is connected to the extension 24 by the rod 28 while the rail 16 is connected to the extension 26 by the rod 30, it being understood that the connection between the rods 28 and 30 at their respective ends may be any suitable hook and eye arrangement as shown in Figs. 1 and 8. The rails 16 and 18 are held rigidly in spaced position by the detachable cross bars or spacers 32 which have the sleeves 34 engaging the rails 16 and 18 as best seen in Fig. 5, the sleeves 34 terminating in pendant eyes 36 which engage the ends of the spacers or bracers 32. In order to support the aquatic amusement device I utilize the floats 38 and 40 which are secured to the rails 16 and 18 either as shown in Fig. 2 or in Fig. 2a.

In Fig. 2 in which I have shown the manner in which one end of the canvas 42 is secured, it will be seen that the end of the strip 42 is draped around the side rail 16 or 18 and is inserted upwardly through the slot 44 near the end of the rail as at A and when it emerges from the slot 44 it is continued as at B to go around the float 38 and then to travel around the opposite side of the rail 16 as at C until it enters the slot 44 downwardly as at D whereupon it is suitably secured as at E to the part of the strip which goes around the float. Also, if desired, the layers of the strip which overlie each other around the rails 16 or 18 may be additionally secured together as at F. It is to be understood that both ends of the strip 42 are secured in the manner shown in Fig. 2 with the intermediate portion of the strip 42 forming a seat over the floats and traversing the space between the rails 16 and 18. The floats 38 or 40 are preferably enclosed in a protective outer casing 50. With respect to Fig. 2a it will be seen that the canvas strip 42 is secured to the float and the rail in a slightly different manner in which I provide the canvas strip 52 which is adapted to be drawn and tightened around the float by any suitable means 54 and that I form the end of the canvas strip 42 into a loop which surrounds the rail 16 or 18 and which is secured to the canvas 52 as at H. In this way I have a detachable connection between the float and the seat-forming strip 42. By inspection of Fig. 1 it will be seen that as many canvas seats 42 as desired may be employed and, where the canvas seat does not coincide with the float as at 42a, the ends of the strip are secured to the rails 16 and 18 in either of the manners illustrated in Figs. 2 or 2a and without being in any way connected to the floats.

In order to permit the playing of cards, checkers or similar board games I have provided the board 56 which is equipped at either end with the brackets 58 which in turn have concave seats which ride slidably secure the board 56 to the rails 16 and 18. If desired the upper ends of the brackets can be made somewhat longer and the lower ends can be shortened or eliminated so that, while the board 56 rests on the rails 16 and 18, it can be removed by simply lifting it upwardly and without the necessity of disengaging any clamps, bolts or the like.

Again referring to Fig. 1 it will be seen that by connecting the auxiliary rails 24 and 26 to the rails 16 and 18 I provide an extension which can be used either for additional seating capacity, or for supporting a motor 60 for supplying motive power. Independently of the extension and motor 60 I provide the paddle wheels 62 which are operated from the seat 42a by means of the crank handles 64. The paddle wheels 62 are preferably formed of the juxtaposed discs 66 and 68 between the peripheries of which are mounted the blades 70. Also between the discs 66 and 68 I provide the inflated element 72 which serves as a float. The crank 64 turns the pinion 74 which in turn meshes with the gear 76 on the shaft 78 which constitutes the axle of the paddle wheels 62. 80 designates any suitable bracket which is secured to the rails 16 and 18 and which affords the necessary bearings 82, all as shown in Fig. 7.

In Fig. 6 I have shown my novel aquatic amusement device as provided with means to permit the playing of a ball game such as tennis and the same consists of suitable uprights 84 braced as at 86 and supporting a netting or other partition 88. 90 designates a ball secured to the string 92 and 94 designates a counting or registering or scoring device. The players, seated on opposite sides of the netting 88, bat the ball to each other over the netting 88 and the device 94 indicates the progress of the game in any desired manner.

In Fig. 10 I have shown my aquatic amusement device as provided with a canopy comprising a roof member 95 having the hinged extension 96 and I may or may not use the pendant side curtains 98, depending on the degree of protection or privary desired, it being understood that the extension 96 can be swung about the hinge 100 in the direction of the arrows as shown in Fig. 10 to overlie the roof part proper 95 of the canopy. The canopy is supported by any suitable arched uprights 102 which are suitably connected to the rail 16 or 18 by the bolt or the like 104 in the manner illustrated in Fig. 13. The canopy is provided, if desired, with the pockets 106 for the reception of provisions. The uprights 102 are suitably braced for reinforcement as at 108 and the converging rods 110 suitably support the canopy roof 95.

In Fig. 14 I have shown the aquatic amusement device as provided with a conventional rudder 112 and a conventional balancing center board 114 together with a mast 118 to which is secured a suitable sail 120.

It will be understood that the ball game construction shown in Fig. 6, the canopy and side curtain arrangement shown in Fig. 10 and the sail construction shown in Fig. 14 are all detachably and interchangeably applied to or removed from the rails 16 and 18 thus greatly increasing the range of usefulness and adaptability of the aquatic amusement device I have shown and described.

While in Fig. 1 I have omitted the canopy which is shown in Fig. 10, the game arrangement shown in Fig. 6 and the sail shown in Fig. 14, it is within the scope of my invention to apply the sail, game arrangement and canopy to the construction shown in Figs. 6, 10 and 14 if desired.

Having thus described my invention, what I claim as new and desire to secure by Letters Patent is:

1. An aquatic amusement device comprising a plurality of annular, flexible and resilient floats, oppositely disposed elongated rails superimposed upon said floats, means for rigidly interconnecting and spacing said rails, and flexible elements having their ends fastened to said rails and the juxtaposed portions of said floats for securing said rails to said floats, said flexible elements extending over said floats between said rails and constituting a seat.

2. An aquatic amusement device comprising a plurality of collapsible, pneumatic floats, oppositely disposed elongated rails superimposed upon said floats, means for rigidly interconnecting and spacing said rails, and flexible elements having their ends fastened to said rails and the juxtaposed portions of said floats for securing said rails to said floats, said flexible elements extending over said floats between said rails and constituting a seat.

3. An aquatic amusement device comprising a plurality of annular, resilient and flexible floats, a pair of rails superimposed upon said floats, each of said rails comprising a plurality of sections detachably connected, cross arms for rigidly spacing said rails, said arms having sleeves at their opposite ends through which said rails are inserted, and flexible strips secured to said rails and said floats and extending over the latter to form a seat.

HOWARD C. KARST.